(12) United States Patent
Preis et al.

(10) Patent No.: US 12,353,019 B2
(45) Date of Patent: Jul. 8, 2025

(54) PLUG CONNECTOR FOR TRANSMITTING OPTICAL AND ELECTRICAL SIGNALS

(71) Applicant: MD ELEKTRONIK GmbH, Waldkraiburg (DE)

(72) Inventors: Roland Preis, Aschau am Inn (DE); Marijela Bajic, Waldkraiburg (DE); Markus Kaaserer, Rott am Inn (DE); Christian Stoemmer, Erding (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 302 days.

(21) Appl. No.: 17/959,363

(22) Filed: Oct. 4, 2022

(65) Prior Publication Data
US 2023/0124895 A1    Apr. 20, 2023

(30) Foreign Application Priority Data
Oct. 18, 2021   (DE) ............... 10 2021 126 914.8

(51) Int. Cl.
*G02B 6/38* (2006.01)
*H01B 11/22* (2006.01)
*H01R 13/639* (2006.01)

(52) U.S. Cl.
CPC ......... *G02B 6/3817* (2013.01); *G02B 6/3831* (2013.01); *G02B 6/3853* (2013.01);
(Continued)

(58) Field of Classification Search
CPC .... G02B 6/3893; G02B 6/322; G02B 6/3817; H01B 11/22
See application file for complete search history.

(56) References Cited

U.S. PATENT DOCUMENTS 5,242,315 A     9/1993  O'Dea
2009/0263086 A1 *  10/2009  Rosenberger ........ G02B 6/3893
                                                    385/61
(Continued)

FOREIGN PATENT DOCUMENTS

CN     102269849 A    12/2011
CN     108475874 A     8/2018
(Continued)

OTHER PUBLICATIONS

NA, Snap-In Male cable connector, https://www.binder-connector.com/en/products/connectors-for-medical-applications/elc/99-1721-000-12-elc-male-cable-connector-contacts-12-60-80-mm-unshielded-solder-ip54 (Year: 2014).*

(Continued)

*Primary Examiner* — Eric Wong
(74) *Attorney, Agent, or Firm* — LEYDIG, VOIT & MAYER, LTD.

(57) ABSTRACT

A plug connector, which can be fastened to a line, for transmitting optical and electrical signals, includes a contact support, two contact fastening regions, a lens fastening region and a locking member. The contact fastening regions are formed in the contact support and are each configured to receive an electrical contact, which is connectable to the line, for transmitting the electrical signals. The lens fastening region is formed in the contact support and is configured to receive, in an aligned manner, a lens member, which is connectable to the line, for transmitting the optical signals. The locking member is lockable to the contact support, and the line is fastenable to the plug connector using the locking member in a locked state.

20 Claims, 6 Drawing Sheets

(52) U.S. Cl.
CPC ........... *G02B 6/3893* (2013.01); *H01B 11/22* (2013.01); *H01R 13/639* (2013.01)

(56) References Cited

U.S. PATENT DOCUMENTS

| | | | |
|---|---|---|---|
| 2012/0070118 A1* | 3/2012 | Ko | G02B 6/3885 359/822 |
| 2012/0076501 A1 | 3/2012 | Ko et al. | |
| 2013/0089290 A1 | 4/2013 | Sloey et al. | |
| 2015/0168655 A1* | 6/2015 | Isenhour | G02B 6/3882 385/75 |
| 2016/0282564 A1 | 9/2016 | Little et al. | |
| 2019/0004261 A1 | 1/2019 | Koch | |
| 2020/0236266 A1* | 7/2020 | Krammer | H04N 23/52 |
| 2023/0178944 A1* | 6/2023 | Wild | H01R 13/719 439/578 |

FOREIGN PATENT DOCUMENTS

| | | | |
|---|---|---|---|
| DE | 3248608 A1 | 7/1984 | |
| DE | 19526267 A1 * | 1/1997 | ........... G02B 6/3817 |
| DE | 19733648 C1 | 6/1999 | |
| DE | 102019125446 A1 | 3/2021 | |
| EP | 1199587 B1 | 4/2002 | |
| EP | 1310813 A1 | 5/2003 | |
| EP | 1850159 A2 | 10/2007 | |

OTHER PUBLICATIONS

Anonymous, "Lucenti Vinci Controller User Manual," Nov. 2018, pp. 1-4, Retrieved from the internet: https://assets-global,website-files.com/5e2ee5235b8bed938ebea3d8/5e55379fbb2bbd5afbb9faac_Vinci-Manual-EN_101.pdf.

* cited by examiner

PLUG CONNECTOR FOR TRANSMITTING OPTICAL AND ELECTRICAL SIGNALS

CROSS REFERENCE TO RELATED APPLICATION

This application claims benefit to German Patent Application No. DE 10 2021 126 914.8, filed on Oct. 18, 2021, which is hereby incorporated by reference herein.

FIELD

The invention relates to a plug connector and to a plug connection for transmitting optical and electrical signals, and to a method for generating a plug connection of this kind.

BACKGROUND

In recent years, driver-assistance systems (ADAS) have increasingly been fitted in motor vehicles, particularly in mid-range and high-end models. International standard SAE J3016 defines six levels of motor vehicle automation, where level 0 defines no automated vehicle functions (besides ABS and ESP) and level 5 defines fully automated driving. Today, vehicles equipped to level 3 can already perform semi-autonomous driving functions and are already being sold by some vehicle manufacturers. To be able to visualize these functions in real-world situations regardless of the weather and the time of day, a vehicle of this kind requires a plurality of different sensors. These should allow the surroundings to be scanned during driving and allow both the roadway conditions and moving objects to be detected. It has been found that to meet these requirements individual sensors (e.g., a front camera) have to have high image and color resolution and at the same time low latency and high data integrity. This leads to very high data rates (several gigabits per second, Gb/s, up to more than 50 Gb/s for level 4 or 5 vehicles), especially since the signals (e.g., image signals, video stream) have to be transmitted to the working processor in the electronic control unit (ECU) without being compressed. In turn, said ECU is also installed at a different location from the sensor. Depending on the circumstances, line lengths of several meters from the sensor to the ECU may be needed. Accordingly, data lines that can meet these high demands are needed in this case. The topology of the ADAS components is generally such that the sensors (cameras, radar, LiDAR, etc.) are located on the outside of the bodywork, at the top behind the windshield, or, for example, also in the side mirrors. The signal-processing control units (ECUs) connected thereto are installed in a concealed manner in the passenger compartment, well protected against environmental influences and damage. To keep the overall cabling requirements as low as possible, to take up as little installation space as possible, and to satisfy the tough requirements regarding temperature and mechanical loading, it is expedient to combine the data transmission lines and the power supply line and any control lines for the sensor in one multiway cable or multiway plug connector, particularly for applications using high-resolution sensors (e.g., camera, radar, LiDAR), which function with an asymmetrical data transmission rate.

High-speed data (HSD) plug connection systems are frequently used in today's automotive industry. HSD plug systems may be equipped with up to four electrical conductors and one electrically conductive outer shield. Sheathed cables having four copper strand wires arranged in a twisted manner as a "star-quad cable" are available and suitable for these plug connectors. This results in two usable twisted pairs for data transmission. Very often, one twisted pair is used for each data direction. Alternatively, for example, one pair may also be used for a power supply (positive/negative) or in mixed form as control lines. However, it is not possible to configure two data line pairs plus one power supply line together with a sheathed cable. The typical transmission bandwidth for HSD cable sets is insufficient for transmitting the above-described data rates.

Depending on the construction, there is a restricted transmission bandwidth for commercially available HSD plug connectors comprising a suitable cable, and this limits the data rate per twisted pair to approximately 3 Gb/s. Data lines having data rates of more than several hundred Mbps require a constant impedance performance over the line length in order to avoid signal impairments (e.g., signal reflections, crosstalk). Owing to the mechanical robustness and structural circumstances, however, this can often only be maintained to a limited extent. Aging effects and impairments resulting from the installation (e.g., small bend radii, pressure points due to cable ties) increase the impedance aberrations of the lines. The higher the data rate or signal frequency used, the more these adverse effects have an impact on the system as a whole.

Technical solutions having a plurality of copper line pairs or a plurality of coaxial cables also allow higher data rates to be transmitted. In these cases, however, it is necessary to use a "multi-lane" (high data rate split over a plurality of lines having a lower data rate, e.g., a 12 Gb/s data link is split over 4×3 Gb/s data lines). However, this is very complex. The higher number of lines and the larger plug connectors needed not only increase the material costs and weight but also considerably increase the required installation space. Greater complexity also occurs with "physical layers" (PHYs, according to the OSI layer model, driver and receiver circuits for the data lines) and EMC-compliant filtering and ESD protection. Moreover, using different signal modulation techniques leads to an economically viable solution only in certain cases. The signal/noise ratio (SNR, e.g., in PAM) of the transmission unit decreases, and/or the electrical power loss in the sending and receiving modules greatly increases. Longer signal transmission delays (e.g., in QAM) due to the modulation and demodulation are intolerable owing to the time-critical safety requirements. In addition, the electrical power loss and unit costs increase due to the considerable added complexity in the electronic circuits.

In many applications, there is no need to provide the complexity for transmitting high data rates in both directions (e.g., from the sensor to the ECU and back again). If this is ever needed, then a data line having a low data rate, e.g., 10 Mb/s or less, is often sufficient as the return channel (e.g., to the sensor). This can then be implemented without considerable effort using conventional electrical data lines.

Owing to the physical advantages of transmitting optical data, it is possible, depending on the type of optical fiber, to transmit data rates, in part also in unmodulated form (NRZ), of more than 25 Gb/s, even over line lengths of several hundreds of meters. In this regard, transmitting optical data also provides the excellent benefits as regards electromagnetic compatibility (electromagnetic interference) and galvanic isolation between the sensor and ECU. Compared with similar solutions based on copper lines, optoelectrical PHYs with significantly lower electrical power loss can be constructed. Operation-induced electrical power loss is a big problem in both the ECUs and the sensors since the defined ambient temperature is already very high in the automotive sector (85° C./105° C.) and it is often very difficult or even impossible to dissipate the heat away from the components at the installation site.

There are optical fiber plug connectors available for various applications and for different fiber types. In this case, the requirements, and thus the structural features, for an optical plug connector differ considerably depending on the type of optical fiber used. The transmission characteristics of an optical fiber for data transmission will be determined by the diameter of the fiber core as well as by the material properties. The smaller the core diameter, the fewer modes transmitted by the fiber. The larger the core diameter, the more modes can propagate in the fiber. Owing to the longer optical path in the fiber, modes of a higher order have a longer propagation time. This can then be seen at the receiver in that the data signal is "smoothed". The amplitude becomes smaller but longer in terms of time. The time pattern tolerable at the receiver for decoding the transmitted bits is thus violated. Transmission errors occur.

Commercially available core diameters are, for example, 9 μm ("single-mode fibers", SM fibers), typically used for long distances (several hundreds of meters up to many kilometers), 50 μm ("multi-mode fibers", MM fibers), for short distances of up to 100 m, e.g., OM3 glass fibers, and 980 μm (step-index fibers), for low data rates and short distances of just a few meters, used as plastics fibers (POF) for the "MOST bus®" in automobile manufacturing. Depending on the material and construction, optical fibers have design-related signal attenuation that is proportional to the length used and also dependent on the wavelength used. For data transmission paths, certain maximum level losses can be tolerated (signal attenuation, insertion loss (IL)). If the level loss reaches a system-defined maximum limit, transmission errors occur or the transmission stops. The aim, therefore, is to keep level losses as low as possible.

Similar signal losses occur in plug connectors for optical fibers owing to mechanical discrepancies (tolerances). For example, axial discrepancies of the fiber cores or a gap between the fiber ends lead to signal attenuations, and greater mode propagation additionally occurs due to angular misalignments (tilt). In the case of an SM fiber having a core diameter of 9 axial misalignments of less than 2 μm should be obtained. This enormously high precision can be achieved only by using highly cost-intensive technology (high-precision ferrules, cost-intensive processing). In addition, the plug connection has to be free from dust particles since they may also attenuate or block optical transmission. This technique is therefore unsuitable for the cost-sensitive, high-volume automobile market, in which the conditions of use are tough.

Plastics fibers having a core diameter of 980 μm provide simple processing and very good robustness in respect of mechanical misalignments in the plugging region, but they are unsuitable for higher data rates of, for example, >1 Gb/s due to the very high signal attenuation (around 160 dB/km) and the very low transmission bandwidth (around 40 MHz km).

In this context, multi-mode fibers having a typical core diameter of 50 μm offer better conditions in terms of bandwidth and processing. However, in the case of a "butt coupling", in which the two fiber ends abut one another at their end faces in the plug connector, the usual tolerance range for electrical plug connectors cannot be applied using said fibers either. The gap produced in the event of tensile stress between the plug connectors would be too large. In addition, there should be almost no dust particles in the optical plugging region. In practice, however, the ingress of dust particles is unavoidable when the plug connection is being marked out during initial assembly, during use, and as a result of wear to the plug components.

Document EP 1 199 587 B1 describes optical plugs, in particular optical plugs containing electrical terminals. In this case, a front part and a rear part of a plug connection are brought into contact in an optical plane in which bushes of the optical plugs then meet. The above-mentioned problems may occur.

SUMMARY

In an embodiment, the present invention provides a plug connector, which can be fastened to a line, for transmitting optical and electrical signals. The plug connector includes a contact support and at least two contact fastening regions, which are formed in the contact support and are each configured to receive an electrical contact, which is connectable to the line, for transmitting the electrical signals. The plug connector further includes at least one lens fastening region, which is formed in the contact support and is configured to receive, in an aligned manner, a lens member, which is connectable to the line, for transmitting the optical signals, as well as at least one locking member, which is lockable to the contact support, wherein the line is fastenable to the plug connector using the locking member in a locked state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
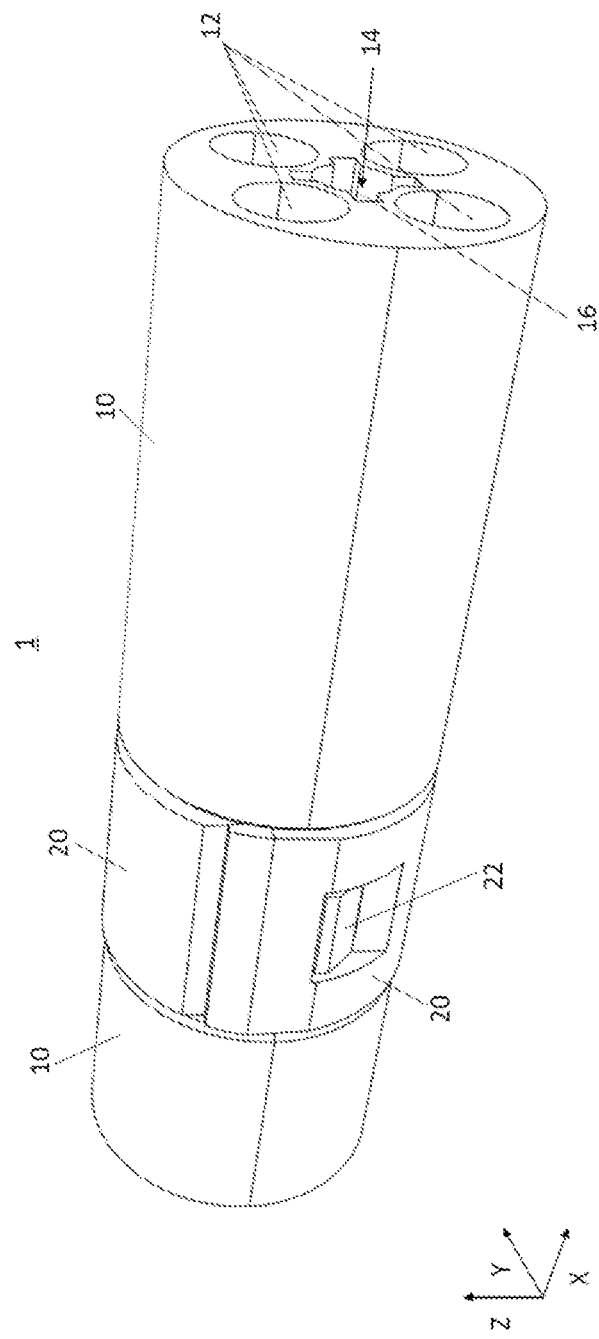
FIG. 1 is a perspective view of an embodiment of a plug connector.

Embodiments of the present invention provide a plug connector, a plug connection, and a method for generating a plug connection for transmitting optical and electrical signals that allow for high rates of data transmission, are resistant to environmental influences, and are compatible with at least one existing plug connection system. Embodiments of the present invention are able to avoid cost-intensive re-development of a plug connector, and the electrical contacts and the mechanical dimensions of existing (HSD) plug connections can be used.

In particular, the high rates of data transmission, resistance to environmental influences, and compatibility with at least one existing plug connection system is achieved in accordance with an embodiment of the present invention by a plug connector, which can be fastened to a line, for transmitting optical and electrical signals, comprising a contact support, at least two contact fastening regions, which are formed in the contact support and in each of which an electrical contact, which can be connected to the line, for transmitting electrical signals can be arranged, at least one lens fastening region, which is formed in the contact support and in which a lens member, which can be connected to the line, for transmitting optical signals can be arranged in an aligned manner, and at least one locking member, which can be locked to the contact support, wherein the line can be fastened to the plug connector using the locking member in the locked state.

The plug connector is configured to enable at least one optical signal path in addition to electrical signal paths. Owing to the optical signal path, considerably higher data rates can be achieved than over purely electrical signal paths. In this case, the connector face of the plug connector is preferably compatible with or identical to current plug systems, in particular the HSD plug system, in terms of external dimensions and the arrangement of the electrical connections. The lens fastening region is characterized in particular in that means for aligning and securing the at least one lens member are provided. In this case, the lens member is deliberately a component that is rigidly connected to the optical conductor before being fitted into the plug connector and can then be arranged in the plug connector in a guided manner and fastened. The precision in the optical signal path is ensured when the optical conductor is connected to the lens member and is not adversely affected upon fitting into the plug connector. The lens fastening region in the plug connector in turn ensures that the optical signal path is correctly aligned so that an optical signal can be relayed to or received by an external component without significant losses. The locking member may be used as a secondary lock. This can increase or ensure the quality of a plug connection between the plug connector and a line. In particular, the line can be fastened to the contact support using the locking member in the locked state. When in the locked state, the locking member preferably encloses a portion of the contact support, in particular a portion that is recessed in the circumferential direction, and is thereby connected or fastened to the contact support. When in the locked state, therefore, the locking member does not project from the outer circumference of the contact support.

Preferably, the at least one lens fastening region is arranged between the at least two contact fastening regions. This arrangement enables the same signal direction for the electrical signal paths and the at least one optical signal path. The arrangement is also space-saving; in particular, an existing plug system, for example the HSD plug system, can be retrofitted with an optical signal path in a relatively simple manner.

Preferably, the lens fastening region has at least one stop on which the lens member can be aligned, and/or at least one lens guide. These alignment and securing means prevent undesirable radial and/or axial movements of the lens member and ensure that the signal path is aligned correctly. Owing to the stop, the lens member may be pushed into the plug connector only by an intended amount.

Preferably, the locking member comprises projections and/or recesses that can be engaged with the contacts and the at least one lens member. The projections and/or recesses can be made on/in the locking member relatively simply, for example by suitable injection molding techniques. The mechanical engagement is resistant to movements on the plug connector and secures the connection. In addition, further securing of the lens member is also made possible. In particular, the line is prevented from being pulled out of the plug connector when the locking member is in the locked state.

Preferably, the plug connector is compatible with an HSD plug connector. In particular, the plug connector has an HSD connector face. An HSD plug connector is preferably used when equipping motor vehicles, such as passenger cars, trucks, and buses. The present plug connector thus has a wide field of application. In particular, the present plug connector may also be connected to a conventional HSD plug connector without an optical signal path, in which case the optical signal path is obviously no longer available for the connection.

The above-mentioned problems are also solved in particular by a plug connection for transmitting optical and electrical signals, comprising a line, which comprises at least two electrical conductors and at least one optical conductor, wherein each electrical conductor is connected to a contact at least at one line end, and the at least one optical conductor is connected to a lens member, and a plug connector, wherein a contact is arranged in each contact fastening region and the at least one lens member is arranged in the at least one lens fastening region, and the plug connector is fastened to the line using the locking member.

The plug connection allows optical signals and data to be transmitted, making very high data rates possible, such as >1 Gb/s. In particular, it is possible to transmit optical and electrical data concurrently. In a vehicle, therefore, different sensors, cameras, etc. can preferably be supplied with power, and data can be received therefrom and sent to a controller (ECU). The data link is preferably asymmetrical, i.e., significantly more data are sent in one direction than in the opposite direction, so an optical conductor is primarily used only for one signal direction.

Preferably, the lens member comprises a lens, in particular a collimator lens, and the lens has an aspherical shape and an anti-reflection coating. The collimator lens is used so as to be able to make use of the existing tolerance range of HSD plug connectors. In particular, a collimator lens expands the optical signal in the plugging region such that a gap of several millimeters in the plugging region can be overcome with low optical signal attenuation. Owing to the use of the collimator lens, small transition gaps are tolerable between the lens and an external component to which the optical signal is to be sent or from which the optical signal is to be received. The aspherical convexity and the anti-reflection coating improve the relaying of the optical signals. Preferably, the lens member also has a housing that encloses the lens and part of the optical conductor. Owing to the protection from the housing, optical signals can be relayed from the optical conductor via the lens to a further external component without interruptions occurring in the optical signal path. Interruptions may, for example, be foreign particles in the optical signal path and/or a gap between the optical conductor and the lens.

Preferably, the lens member has ribs on its circumference. The ribs form a mechanical stop on the end face of the connector face. In addition, they help to minimize the axial angular distortion (tilt) of the lens or lens member. This is because the axial angular distortion (tilt) is critical for optical signal attenuation. The lens or lens member has to be as parallel to the optical axis as possible. A distortion of just 1° leads to optical attenuation of several dB. The mode noise in the signal also sharply increases. The axial offset may be in the range of 1 to 2 tenths of a millimeter without generating any relatively high optical attenuation. By minimizing the axial angular distortion, the available mechanical tolerance range, in particular in HSD plug connectors, may also be used for relaying optical signals.

Preferably, the optical conductor has at least one multi-mode fiber. Multi-mode fibers having a typical core diameter of 50 µm offer good conditions in terms of bandwidth and processing.

The above-mentioned problems are also solved in particular by a method for generating a plug connection, the method comprising the following steps: providing a line that comprises at least two electrical conductors and one optical conductor, connecting, at least at a free end of the line, the electrical conductors to contacts, and connecting the at least one optical conductor to a lens member, inserting the contacts and the at least one lens member, which are connected to the line, into a plug connector, and fastening the plug connector to the line, wherein at least one locking member is locked on the plug connector.

The contacts and the lens member may be applied using intermediate steps, with different time sequences being possible. Unlike when the optical conductor is coupled to an optical member in the plug connector, the lens member and optical conductor are interconnected before being fitted into the plug connector. This ensures the high precision when the lens and optical conductor are coupled. The precise alignment of the optical signal path is ensured when the lens member is fitted into the plug connector together with the connected optical conductor and when it is locked in the plug connector.

Preferably, in the step of fastening the plug connector to the line, at least one locking member on the plug connector is engaged with the contacts and the at least one lens member. The engagement allows for interlocking fastening. This fastening is robust and withstands large forces, in particular tensile forces exerted crosswise, without exerting a direct pressure force or the like on the conductors or other parts of the line.

Preferably, the step of connecting the optical conductor to the lens member is carried out by gluing and/or encapsulation. In these connection techniques, the lens is in particular rigidly connected to the line such that no gap is produced between the lens and the optical conductor. This achieves very high precision in the optical signal path.

Embodiment examples will be described in detail below with reference to the drawings.

FIG. 1 shows an embodiment example of a plug connector 1. The plug connector 1 has a contact support 10 and a locking member 20. The contact support 10 and the locking member 20 are preferably made of plastics material. In particular, the outer dimensions of the plug connector 1 are compatible with or identical to an HSD plug connector.

The locking member 20 is composed of two components in the embodiment shown. In alternative embodiment examples, the locking member 20 may be constructed from one or more components. The locking member 20 may be fastened to the contact support 10 and locked either manually or in an automated process. For the locking, the locking member 20 has at least one locking means 22. In the embodiment shown, the locking means 22 is configured as a snap-in connection. A snap-in connection allows for a long-lasting connection that can also be released again using a tool. For instance, the plug connector 1 can be disassembled again after its service life in order to comply with certain requirements, e.g., environmental regulations. Other lock forms are possible.

In the embodiment example shown, the contact support 10 has four contact insertion openings 12 through which a total of four contacts 36 fastened to electrical conductors 32 of a line 30 can be inserted into the contact support 10 or plug connector 1. Between the four contact insertion openings 12 there is arranged a lens insertion opening 14 through which a lens member 37 fastened to an optical conductor 34 of the line 30 can be inserted into the contact support 10 or plug connector 1. The lens insertion opening 14 is preferably arranged symmetrically between the contact insertion openings 12. Emanating from the middle of the lens insertion opening 14, the lens insertion opening 14 has radially protruding notches that form lens guides 16. The number and arrangement of the lens guides 16 allows the lens member 37 to be aligned in the plug connector 1. In addition, coding between the lens member 37 and the plug connector 1 would be possible.

Figure 2:
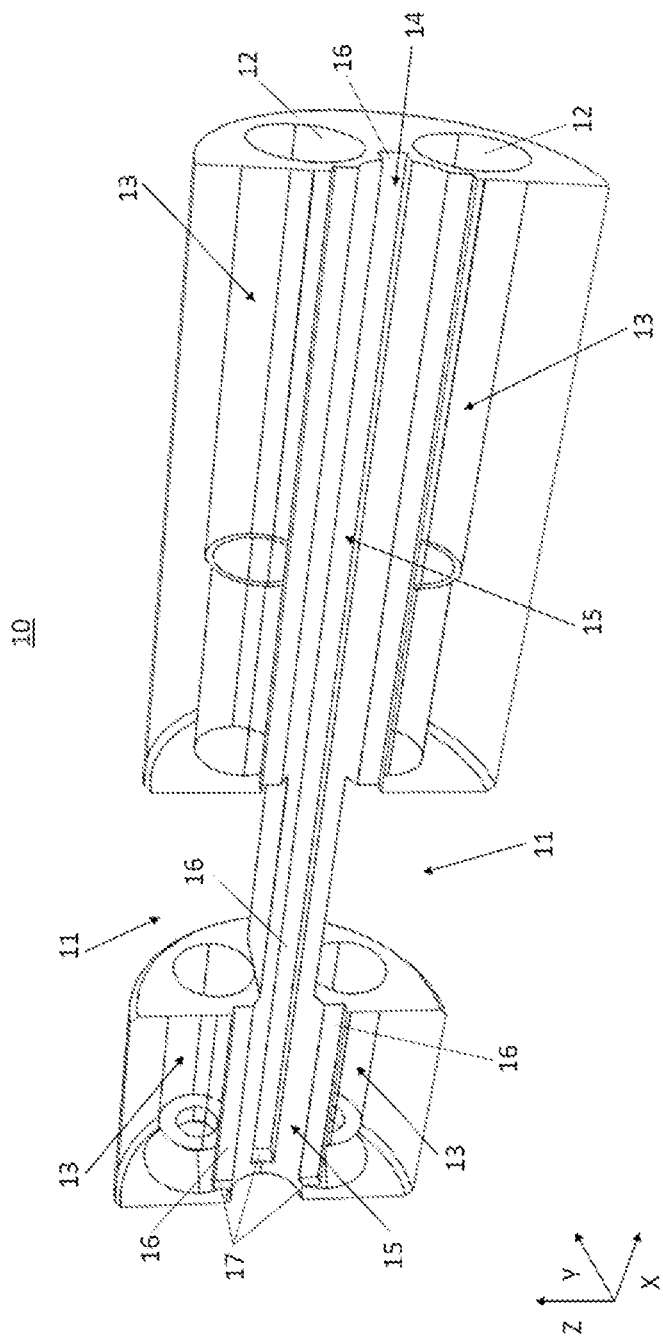
FIG. 2 is a longitudinal sectional view of the embodiment of the plug connector from FIG. 1 without any locking members.

FIG. 2 is a longitudinal sectional view through the contact support 10 without any locking members 20. As shown in FIG. 2, the contact insertion openings 12 lead to corresponding contact fastening regions 13 inside the contact support 10. Electrical contacts 36 may be arranged in the contact fastening regions 13. The contact fastening regions 13 are formed such that in each case a complete contact 36 and an adjoining part of a conductor 32 are received in the contact support 10. As a result, the contacts 36 and the transitions between the conductors 32 and the contacts 36 are protected against damaging environmental influences. To provide a compact arrangement, in the embodiment example shown two conductor pairs are in each case arranged next to one another or one above the other.

A lens fastening region 15 is formed between the contact fastening regions 13. The lens fastening region 15 is configured to receive an optical conductor 34 to which a lens member 37 is fastened, the optical conductor 34 being aligned with the lens member 37 in the contact support 10. In the embodiment example shown, the lens member 37 is aligned by four symmetrically arranged lens guides 16, which are configured in the form of guide tracks, in particular along the entire lens fastening region 15, and a stop 17 in each lens guide 16.

Figure 3:
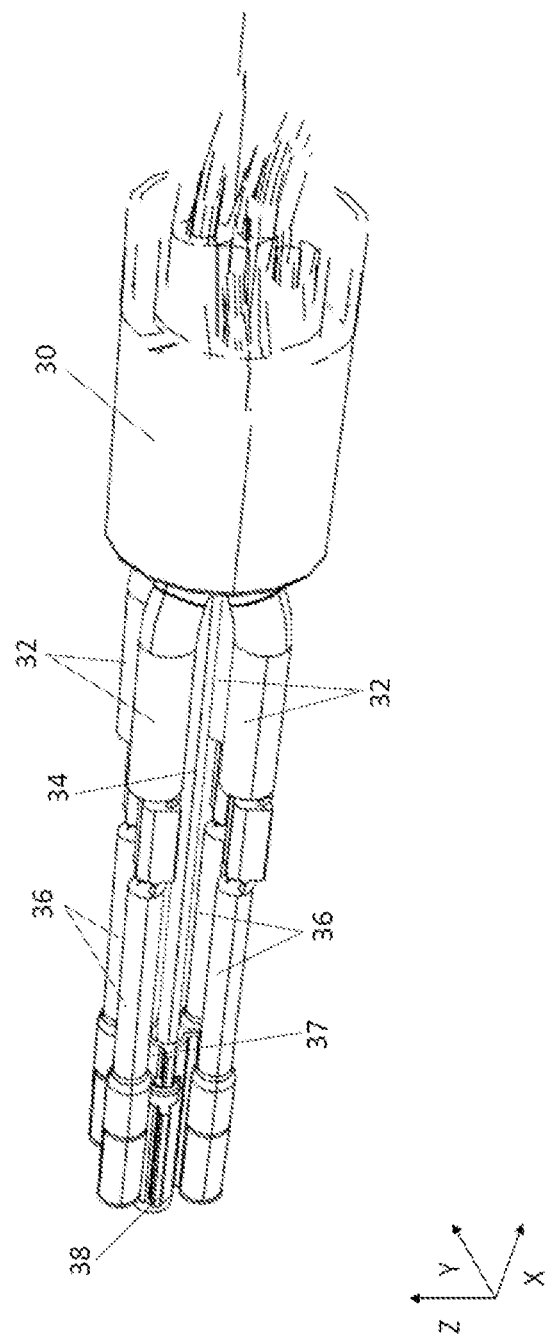
FIG. 3 is a perspective view of an embodiment of a line, in which contacts and a lens member are fastened, at free ends of the conductors, to the electrical and optical conductors, respectively.

FIG. 3 shows an embodiment example of a line 30 having four electrical conductors 32 and an optical conductor 34. Preferably, the line 30 is a shielded four-wire line to which an optical conductor 34 has been added. In an alternative embodiment, the line 30 may be a two-wire line to which an optical conductor 34 has been added. The four electrical conductors 32 have been stripped at their ends so as to generate a direct electrical connection between the conductors 32 and the (inner conductor) contacts 36, preferably by way of a crimp connection. The electrical contacts 36 may be fastened to the conductors 32 before, after, or at the same time as the lens member 37 is fastened to the optical conductor 34. The four contacts 36 are preferably aligned in parallel with one another before being fitted into a plug connector 1.

In the embodiment example shown, the optical conductor 34 is arranged in the middle in the line 30. In other embodiment examples, the optical conductor 34 may also be arranged at a different position in the line 30. Preferably, the optical conductor 34 extends, in particular at its free end, in parallel with the electrical conductors 32 in order to have to same signal direction. At its free end, the optical conductor 34 is rigidly connected to a lens member 37.

The lens member 37 has at least one lens 39 and a housing. The housing together with the lens 39 may be connected to the optical conductor as a separate component, for example by gluing, or the housing is generated by encapsulation of the lens 39 and the optical conductor 34. By way of the gluing and/or encapsulation, the lens member 37 is connected to the optical conductor 34 permanently and non-displaceably. In addition, said connection techniques prevent foreign particles from entering the optical signal path there and/or prevent interruptions in the optical signal path, for example due to gapping between the lens 39 and the optical conductor 34.

For optical signals to be relayed with as little loss as possible, the lens 39 has been adapted precisely. The lens 39 is made of glass, PMMA, or, for example, polyetherimide (PEI), polycarbonate (PC), or a plastics material having suitable optical properties. In particular, the lens 39 is a collimator lens having an aspherical convexity on its side facing away from the optical conductor 34. Preferably, the convexity also has an anti-reflection coating. In one embodiment example, the active diameter of the lens 39 is in the range of 0.5 mm to 1.5 mm, preferably 0.8 mm to 1.2 mm. The length of the lens 39 (from the optical conductor 34 to the center of the lens) is determined by the numerical aperture (NA) of the fiber used, the maximum beam expansion diameter, and the lens material used. In one embodiment example, the length of the lens 39 is in the range from 2 to 4 mm, preferably in the range from 2.8 to 3.8 mm.

Figure 4:
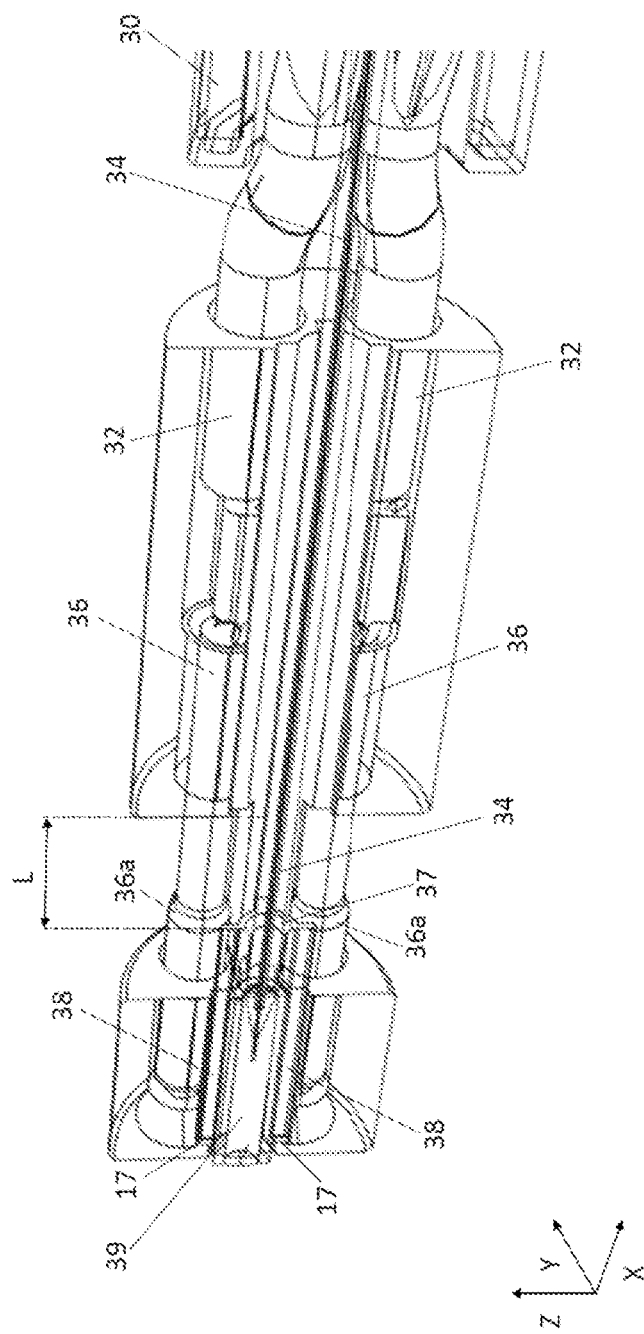
FIG. 4 shows the illustration from FIG. 2 with the inserted embodiment of a line from FIG. 3.

FIG. 4 shows a sub-step when generating a plug connection 100. The line 30, which has been equipped with contacts 36 and a lens member 37, has been inserted into the contact support 10, without any locking members 20, through the contact insertion openings 12 and the lens insertion opening 14. In the final assembly position shown, in which at least the optical conductor 34 may be locked in the plug connector 1 together with the lens member 37, the lens member 37 abuts the stops 17 in the lens guides 16. In the final assembly position, a notch of a length L is produced between the lens member 37 and a side edge of the contact support 10. In addition, notches may arise between projections 36a on the contacts 36 and side edges of the contact support 10.

Figure 5:
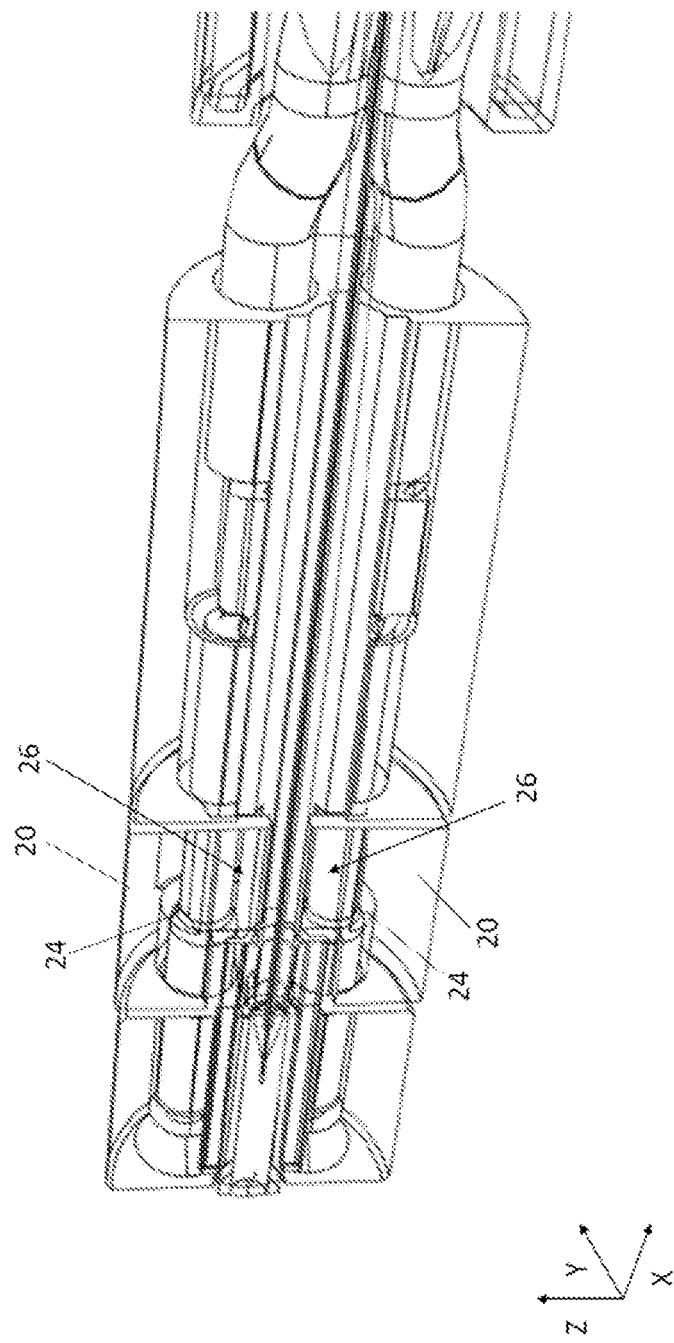
FIG. 5 shows the illustration from FIG. 4 with engaged embodiments of locking members.

FIG. 5 shows a subsequent sub-step when generating the plug connection 100. To fasten the plug connector 1 to the line 30, the locking members 20 are arranged on the contact support 10 and are locked together using locking means 22. The locking means 20 are interlockingly arranged in a gap 11 in the contact support 10. The locking members 20 are unable to be displaced or detach inadvertently. In the locked state, radially inwardly extending projections 26 on the locking members 20 engage in the at least one notch of length L between the lens member 37 and a side edge of the contact support 10. In addition to the lens guides 16, which prevent the lens member 37 from inadvertently moving radially, the stops 17 on one side and the at least one projection 26 on the locking members 20 on the other side prevent the lens member 37 from inadvertently moving axially. Moreover, in the embodiment example shown, accordingly adapted recesses 24 and projections on the locking members 20 engage between the projections 36a on the contacts 36 and the side walls of the contact support 10, thereby preventing the contacts 36 from being displaced inadvertently. Since the contacts 36, and also the lens member 37, are rigidly connected to the corresponding conductors 32, 34 of the line 30, the line 30 is also fastened to the plug connector 1 by the contacts 36 and lens member 37 being secured in the contact support 10 or plug connector 1.

Figure 6:
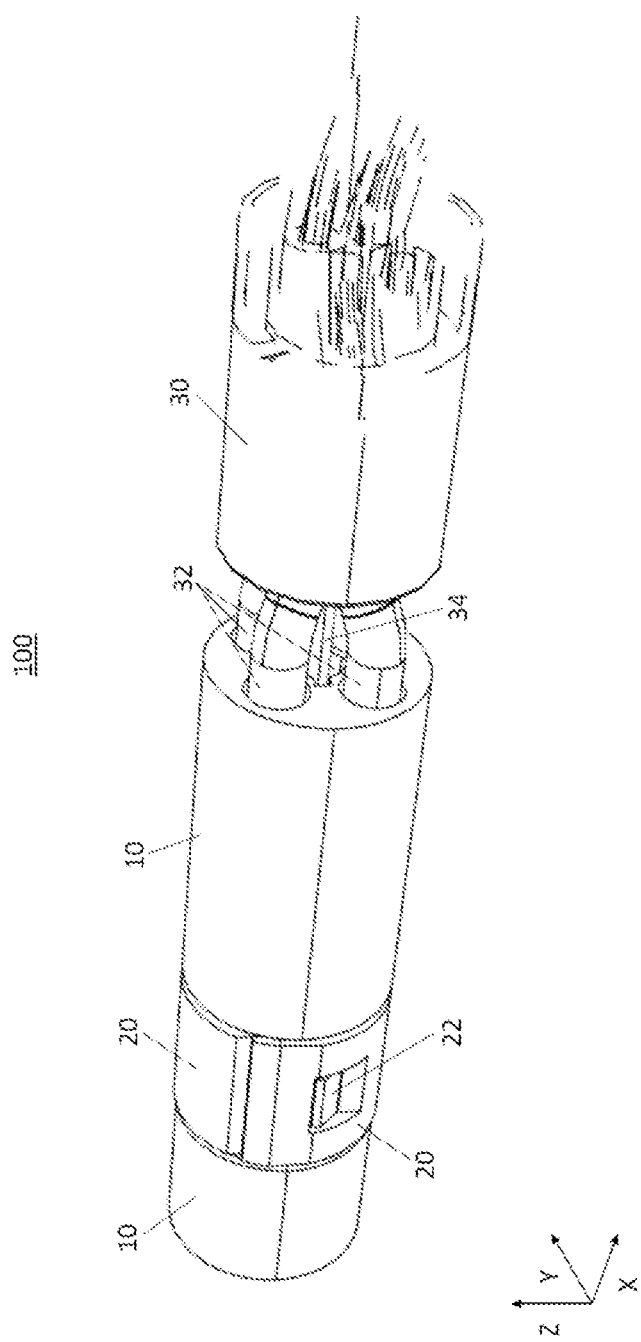
FIG. 6 shows the illustration from FIG. 1 with the inserted embodiment of a line from FIG. 3.

FIG. 6 shows an embodiment of a generated plug connection 100. By way of the optical signal path, the plug connection 100 allows for a considerably higher data rate than is possible over a purely electrical plug connection. Owing to the dimensions and position of the electrical contacts 36, the plug connection 100 shown can, however, also be connected to a purely electrical plug connection, in particular an HSD plug connection. In this case, the optical signal path is not used but the electrical signals paths are in operation. A housing may be arranged over the plug connection 100.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
10 Contact support
11 Gap
12 Contact insertion opening
13 Contact fastening region
14 Lens insertion opening
15 Lens fastening region
16 Lens guide
17 Stop
20 Locking member
22 Locking means
24 Recess
26 Projection
30 Line
32 Electrical conductor
34 Optical conductor
36 Contact
37 Lens member
38 Rib
39 Lens
L Length
X Longitudinal direction
Y First transverse direction
Z Second transverse direction

What is claimed is:

1. A plug connector, which can be fastened to a line, for transmitting optical and electrical signals, the plug connector comprising:
   a contact support;
   at least two contact fastening regions, which are formed in the contact support and are each configured to receive an electrical contact, which is connectable to the line, for transmitting the electrical signals;
   at least one lens fastening region, which is formed in the contact support and is configured to receive, in an aligned manner by one or more lens guides extending along the at least one lens fastening, a lens member, which is connectable to the line, for transmitting the optical signals, the one or more lens guides being configured to align the lens member in a defined radial orientation and prevent radial movement of the lens member; and
   at least one locking member, which is lockable to the contact support, wherein the line is fastenable to the plug connector using the locking member in a locked state.

2. The plug connector according to claim 1, wherein the at least one lens fastening region is arranged between the at least two contact fastening regions.

3. The plug connector according to claim 1, wherein the at least one lens fastening region has at least one stop on which the lens member is alignable.

4. The plug connector according to claim 1, wherein the at least one locking member comprises projections and/or recesses that are configured to engage with the contacts and the lens member.

5. The plug connector according to claim 1, wherein the plug connector is compatible with a high-speed data (HSD) plug connector.

6. A plug connection for transmitting optical and electrical signals, the plug connection comprising:
   the plug connector according to claim 1; and
   the line, which comprises at least two electrical conductors and at least one optical conductor, wherein each of the at least two electrical conductors is connected to a respective one of the electrical contacts at least at one line end, and the at least one optical conductor is connected to the lens member, and
   wherein one of the electrical contacts is arranged in a respective one of the at least two contact fastening regions and the lens member is arranged in the at least one lens fastening region, and the plug connector is fastened to the line using the locking member.

7. The plug connection according to claim 6, wherein the lens member comprises a lens, and the lens has an aspherical shape and an anti-reflection coating.

8. The plug connector according to claim 7, wherein the lens is a collimator lens.

9. The plug connection according to claim 6, wherein the lens member has ribs on its circumference.

10. The plug connection according to claim 6, wherein the optical conductor has at least one multi-mode fiber.

11. A method for generating a plug connection, the method comprising:
   providing a line that comprises at least two electrical conductors and at least one optical conductor;
   connecting, at least at a free end of the line, the at least two electrical conductors to electrical contacts; and
   connecting the at least one optical conductor to a lens member;
   inserting the electrical contacts and the lens member, which are connected to the line, into a plug connector, the lens member being inserted in an aligned manner along one or more lens guides extending along at least one lens fastening region of the plug connector such that the one or more lens guides align the lens member in a defined radial orientation and prevent radial movement of the lens member; and
   fastening the plug connector to the line by moving at least one locking member of the plug connector into a locked state.

12. The method according to claim 11, wherein, in the step of fastening the plug connector to the line, the at least one locking member on the plug connector is engaged with the electrical contacts and the lens member.

13. The method according to claim 11, wherein the step of connecting the at least one optical conductor to the lens member is carried out by gluing and/or encapsulation.

14. The method according to claim 11, wherein the at least one locking member includes a projection that engages, in the locked state of the at least one locking member, in a notch between the lens member and a side edge of a contact support of the plug connector to fasten the plug connector to the line.

15. The method according to claim 14, wherein, in the locked state of the at least one locking member, the lens member is prevented from moving axially by being positioned between a stop of the one or more lens guides on one side and the projection of the at least one locking member on the opposite side.

16. The method according to claim 11, wherein the at least one locking member comprises projections and/or recesses that, in the locked state of the at least one locking member, engage between corresponding projections and/or recesses on the electrical contacts and side walls of a contact support of the plug connector to prevent axial movement of the electrical contacts.

17. The plug connector according to claim 1, wherein the at least one locking member, in the locked state, interlockingly engages in a gap in the contact support.

18. The plug connector according to claim 1, wherein the at least one locking member includes a projection that engages, in the locked state of the at least one locking member, in a notch between the lens member and a side edge of the contact support.

19. The plug connector according to claim 18, wherein, in the locked state of the at least one locking member, the lens member is prevented from moving axially by being positioned between a stop of the one or more lens guides on one side and the projection of the at least one locking member on the opposite side.

20. The plug connector according to claim 4, wherein the projections and/or recesses of the at least one locking member are configured to engage between corresponding projections and/or recesses on the electrical contacts and side walls of the contact support in the locked state of the at least one locking member to prevent axial movement of the electrical contacts.

* * * * *